United States Patent [19]

Kulkarni et al.

[11] 4,115,513
[45] Sep. 19, 1978

[54] PROCESSING OF AMMONIUM PARATUNGSTATE FROM TUNGSTEN ORES

[75] Inventors: Avinash D. Kulkarni, Montclair, N.J.; James G. Cleary, Dormont Borough, Pa.

[73] Assignee: Westinghouse Electric Corp., Pittsburgh, Pa.

[21] Appl. No.: 825,124

[22] Filed: Aug. 16, 1977

[51] Int. Cl.² .................................... C01G 41/00
[52] U.S. Cl. .......................... 423/56; 423/54; 423/58; 423/55
[58] Field of Search ............ 423/54, 55, 56, 58; 75/101 BE

[56] References Cited

U.S. PATENT DOCUMENTS

| | | | |
|---|---|---|---|
| 1,293,404 | 2/1919 | Giles et al. | 423/55 |
| 1,399,705 | 12/1921 | Ekeley et al. | 423/56 |
| 2,801,152 | 7/1957 | Kasey | 423/56 |
| 3,052,516 | 9/1962 | Drobnick et al. | 423/54 |
| 3,193,347 | 7/1965 | Forward et al. | 423/54 |
| 3,256,057 | 6/1966 | Burwell | 423/56 |
| 3,969,484 | 7/1976 | Onozaki et al. | 423/58 |

FOREIGN PATENT DOCUMENTS

| | | | |
|---|---|---|---|
| 836,441 | 3/1970 | Canada | 423/54 |
| 684,892 | 7/1968 | South Africa | 423/55 |

Primary Examiner—Herbert T. Carter
Attorney, Agent, or Firm—W. D. Palmer

[57] ABSTRACT

To obtain highly purified, lamp grade ammonium paratungstate crystals from any of several different tungsten ores, the ore is reduced to finely divided status and slurried in heated HCl solution to convert tungsten values to $WO_3 \cdot H_2O$. Recovered tungstic oxide is washed and dissolved in heated aqueous solution of sodium carbonate or sodium hydroxide with the pH maintained at about 8 to 8.5 to form soluble sodium tungstate. Sodium hydroxide is added to raise the pH to about 10.5 to 11.5, and magnesium chloride is added in amount sufficient to somewhat neutralize the solution. Sodium hydroxide is added to raise the pH to about 10.5 to 11.5 to precipitate as hydroxide the magnesium and additional metallic impurities. At least one of ammonium sulfide and thioacetamide is and the heated solution is acidified to a pH in the range from about 2 to 3 to precipitate any molybdenum as $MoS_3$. The tungstate solution is then contacted with an organic, water-immiscible ion exchange liquid in which the active ingredient is an amine salt to extract the tungsten values. Tungsten values are then stripped from the ion exchange liquid with ammonium hydroxide to form ammonium tungstate solution, which in turn is separated. From the ammonium tungstate solution is crystallized highly purified ammonium paratungstate. The process is adaptable to continuous type operation.

4 Claims, 2 Drawing Figures

PROCESSING OF AMMONIUM PARATUNGSTATE FROM TUNGSTEN ORES

BACKGROUND OF THE INVENTION

This invention relates to the production of lamp filament grade ammonium paratungstate from tungsten ores and, more particularly, to a purification process which is operable to produce lamp grade ammonium paratungstate from any of a variety of tungsten ores.

Tungsten bearing ores such as wolframite (a tungstate of iron and manganese), scheelite (native calcium tungstate), or ferberite (predominantly iron tungstate) have all been used in various refinement processes in order to produce highly purified lamp grade ammonium paratungstate crystals which have the formula $(NH_4)_{10}W_{12}O_{41} \cdot X \ H_2O$. The purification steps have normally involved forming alkali tungstate solutions to remove impurities and ultimately forming a highly purified ammonium tungstate solution which is then crystallized to the paratungstate form. Many of there prior art processes have been adapted to a batch type operation and very few are operable to refine more than one specific type of ore for which the process is designed.

Typical tungsten refining processes are set forth in U.S. Pat. No. 3,193,347 dated July 6, 1965 to Forward et al. which discloses that scheelite tungsten ore is digested with hydrochloric acid to produce a solid mixture which contains tungstic acid and gangue or waste material. After separation of solids from the solution, such as by filtration, the tungstic acid content is dissolved in sodium hydroxide to produce sodium tungstate which is then separated from the undissolved residue by filtration.

U.S. Pat. No. 1,293,404 dated Feb. 4, 1919 to Giles et al. discloses at page 1 the use of calcium chloride for purifying alkali tungstate solutions. Giles also discloses that any compound of other alkaline earth metals may be used instead of the calcium chloride to effect the purification.

U.S. Pat. No. 1,399,705 dated Dec. 6, 1921 to Ekeley et al. discloses at page 1, line 104, that an oxidizing agent can be added to the sodium tungstate solution and thereafter, magnesium salt such as the sulphate or chloride is added to the solution in a quantity sufficient to combine with phosphorus and arsenic in order to remove same. At page 2, line 15-25 the patentee discloses that the solution is rendered basic by the addition of commercial ammonia and by the further addition of ammonium chloride which precipitates ammonium magnesium phosphate impurity.

U.S. Pat. No. 3,256,057 dated June 14, 1966 to Burwell discloses at column 1, lines 40-50 the removal of molybdenum from scheelite ores by adding sodium sulfide, sodium bisulfide or ammonium sulfide to an alkali tungstate solution in amount more than sufficient to form molybdenum trisulfide of all of the molybdenum present, and adding sufficient mineral acid to provide a pH of at least 3. The solution is then brought to the temperature of 80° C or more and the molybdenum sulfide precipitate is separated from the solution by filtration.

The technique of extraction of tungsten values from an acidic sodium tungstate solution is disclosed in South African Pat. No. 684,892 dated July 17, 1968. This Patent discloses specific extractives which can be any of a variety of amines, a so-called phase conditioner which is used to enhance the efficiency of the extractive, and a diluent such as kerosene. This South African Patent also discloses stripping the tungsten values from the organic solvent with ammonium hydroxide. Thereafter, ammonium paratungstate is produced from an ammonium tungstate solution.

SUMMARY OF THE INVENTION

There is provided a method of obtaining highly purified ammonium paratungstate crystals from tungsten ore which is first reduced to a very finely divided status. There is then formed a slurry of the finely divided ore in a moderately strong HCl solution and the slurry is digested at a temperature of at least about 100° C for a sufficient time to substantially convert the tungsten values in the ore to $WO_3 \cdot H_2O$. The resulting tungstic oxide is separated from the acid solution to remove acid-soluble impurities from the tungstic oxide, and the separated tungstic oxide is water washed to remove substantially all remaining watersoluble impurities therefrom. The washed tungstic oxide is dissolved in an aqueous solution of $Na_2CO_3$ or NaOH at a temperature slightly below the boiling point of water with the pH adjusted to a steady value of from about 8 to 8.5 to convert the insoluble tungstic oxide to soluble sodium tungstate solution, and the soluble sodium tungstate solution is separated from remaining insoluble material to remove further impurities. The resulting sodium tungstate solution is heated to a temperature slightly below the boiling point of water and sodium hydroxide is added thereto to raise the pH to from about 10.5 to 11.5. Magnesium chloride is added to the heated tungstate solution in amount sufficient at least to somewhat neutralize, i.e., lower the pH of, the solution and there is then added to the resulting solution additional sodium hydroxide to raise the pH thereof to about 10.5 to 11.5. This precipitates as hydroxide the magnesium and additional metallic impurity, leaving a further purified sodium tungstate solution which is separated from the formed precipitate. To the further purified sodium tungstate solution is added at least one of ammonium sulfide and thioacetamide in amount more than sufficient to react with any molybdenum impurity present to form $MoS_3$, and with the solution at a temperature slightly less than the boiling point of water, the solution is acidified to a pH in the range of from about 2 to 3 to precipitate all molybdenum as $MoS_3$ from the sodium tungstate solution. The precipitated $MoS_3$ is then separated from the residual solution. The resulting purified sodium tungstate solution is intimately contacted with a water-immiscible ion exchange liquid in which the active ingredient is amine salt, the anionic portion of which is exchanged with the tungstate radical of the sodium tungstate solution to form amine tungstate and the corresponding sodium salt. The immiscible liquids are settled to separate them and the separated liquids are isolated from each other. The tungsten-containing ion exchange liquid is then intimately contacted with ammonium hydroxide solution to form immiscible ammonium tungstate solution and tungstate-stripped ion exchange liquid. These immiscible liquids are settled to separate them, and the separated liquids are isolated from each other. In a final step, the isolated ammonium tungstate solution is converted to ammonium paratungstate crystals, and the ammonium paratungstate crystals are then separated from residual solution.

BRIEF DESCRIPTION OF THE DRAWING

For a better understanding of the invention, reference may be had to the accompanying drawings, in which.

DESCRIPTION OF THE PREFERRED EMBODIMENTS

Figure 1:
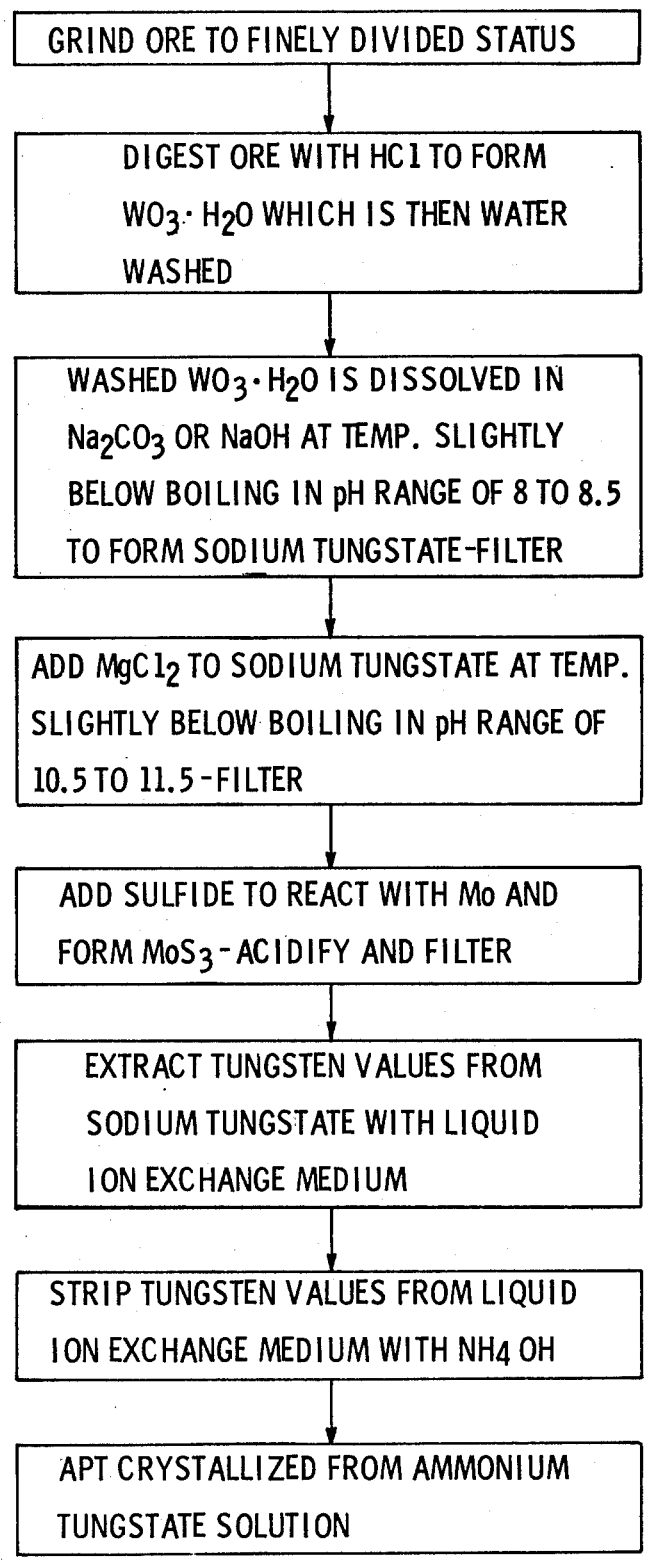
FIG. 1 sets forth a flow chart briefly outlining the basic steps of the present method.

The following description will be broken down under sub-headings in accordance with the process steps as shown in the flow chart and as being described. This description will consider different tungsten ores, where applicable, and the three ores considered will be scheelite, wolframite and ferberite as well as mixtures of these ores. Where specific examples are given with respect to quantities, these will be bench scale quantities which, of course, can be readily scaled up if desired. The reactor used in the following description is a glass-lined reactor rated for 150 psi internal pressure, variable speed agitator, bottom outlet valve and necessary water inlets. The reactor is adapted to be heated by means of an oil heating system.

Reduction Of Ore To Finely Divided Status

For best results, the ore should be reduced to very finely divided status such as 95% of the ore particles having a diameter less than about 40 microns and this is preferably achieved by means of wet grinding in a commercial type grinding mill. More specifically, wet grinding is accomplished with water and ore on a 1:2 weight basis. Alumina grinding balls are preferred.

Hydrochloric Acid Decomposition Of Ground Ore

Scheelite ore which is primarily calcium tungstate will react with hydrochloric acid to form calcium chloride and tungstic oxide ($WO_3 \cdot H_2O$). Wolframite ore is primarily iron-manganese tungstate and will react with hydrochloric acid to form iron-manganese chloride and tungstic oxide. Ferberite ore is primarily iron tungstate and will react with hydrochloric acid to form iron chloride and tungstic oxide. In reacting the ore and acid, reaction temperature and time will vary somewhat for optimum reaction depending upon the type of ore. For example, with 17 wt.% hydrochloric acid, at 100° C scheelite can be substantially decomposed in less than 2 hours. On the other hand, with high manganese containing wolframite, for optimum HCl utilization, 22% to 26 wt.% HCl is desired and higher reaction temperatures and longer reaction times are required. As a specific example, calculated amounts of water and 31% HCl are poured into the glass-lined reactor and the agitator turned on. There is then added to the reactor the wet ground slurry with the relative weight percentages such that for each kilogram of dry ore, 2 liters of the HCl solution are present in the reactor. In the case of scheelite, the optimum HCl strength is 15 wt.% and in the case of wolframite or ferberite, the optimum HCl strength is 22 to 24 wt.%. The heating system is actuated and the agitator speed increased and the ore is digested at a temperature at least about 100° C for a sufficient time to substantially convert the tungsten values in the ore to $WO_3$. In the case of scheelite, the optimum reaction temperature is 110° to 120° C with the reaction time being 3 hours. In the case of wolframite or ferberite, the optimum reaction temperature is 130° to 140° C with the optimum reaction time being 4 to 6 hours. Whatever the ore, by proper selection of acid concentration and temperature, it is always possible to obtain more than 99% decomposition to tungstic oxide in less than 6 hours. After decomposition, the spent acid is removed and the decomposed ore is water-washed. This step removes the substantial portion of all impurities which are acid-soluble and water-soluble.

Conversion Of Tungstic Oxide To Sodium Tungstate

Tungstic oxide will react with either sodium hydroxide or sodium carbonate to form water-soluble sodium tungstate ($Na_2WO_4$). The decomposed ore is suspended in water in the reactor and the temperature thereof raised to slightly less than the boiling point of water. As a specific example, with the reactor agitator operating, the decomposed ore is slurried in deionized water and the reactor heated to a temperature of from about 80° to 90° C. Under these conditions, 10% sodium hydroxide solution is added until the pH is stable at a value of from about 8 to 8.5. At this point, the dissolution of the tungstic oxide is considered complete. The slurry is then removed and the formed sodium tungstate solution is recovered by filtration. The solid material recovered from the filtration step is then re-slurried and filtered in order to recover any residual soluble sodium tungstate. In the foregoing processing step, sodium carbonate solution in concentration of 130 grams per liter can be used to replace the sodium hydroxide with equivalent results.

The foregoing tungstic oxide dissolution step removes substantially all insoluble impurities present in the decomposed ore, examples being silica, titania, etc. which are separated by the filtration.

Magnesium Chloride Treatment For Further Purification

In accordance with the present refining method, a later refining step is that of solvent extraction which is used to selectively extract the tungsten values from an alkali tungstate solution to produce ammonium tungstage by a liquid ion exchange process. The foregoing sodium tungstate in aqueous solution can contain from 1 to 5% impurities and with this degree of impurity concentration, the selectivity of a solvent is not as effective as desired since the solvent extraction process is much more selective when the impurity level in the material being processed is reduced as much as possible.

In treating the sodium tungstate solution with magnesium choride, 25 to 35 liters of filtered sodium tungstate solution (specific gravity 1.2–1.25) is placed in the reactor. The heating system and agitator are then turned on and when the solution is at a temperature slightly less than boiling, sodium hydroxide pellets are added in amount sufficient to raise the pH of the solution to about 10.5 to 11.5. Under these conditions, for every liter of solution in the reactor, 13 grams of $MgCl_2 \cdot 6H_2O$ are added and this amount somewhat neutralizes the solution. As a specific example, the solution is at a temperature of from 80° to 90° C when the magnesium chloride is added and with the solution maintained at this temperature, additional sodium hydroxide is added in amount sufficient to raise the pH thereof to about 10.5 to 11.5. This causes the magnesium and additional metallic impurity to precipitate as the hydroxides leaving a further purified sodium tungstate solution. Thereafter, the solution is filtered to remove the magnesium hydroxide and impurity hydroxides. This step reduces the concentration of impurity elements such as niobium, iron, aluminum, titanium and silicon by a factor of about 10 and only molybdenum impurity remains to any appreciable degree.

Removal Of Molybdenum Impurity

Molybdenum is a common impurity in tungsten ores with the concentration ranges being from less than 50 ppm to over 10,000 ppm and because of the chemical similarities between molybdenum and tungsten, their separation is a difficult task. If a significant concentration of molybdenum is present in a lamp filament, the performance of the filament is substantially impaired. According to present established specifications, the upper tolerable limit of molybdenum is about 20 parts per million.

In order to separate molybdenum from the sodium tungstate solution, the solution is placed into the reactor and there is added thereto ammonium sulfide or thioacetamide or mixtures thereof in amount more than sufficient to react with any molybdenum impurity present in order to form molybdenum trisulfide. The solution is heated to slightly less than the boiling point of water, such as from about 70° to 95° C and the pH is lowered to from about 2 to 3. This precipitates substantially all molybdenum as molybdenum trisulfide leaving the highly purified sodium tungstate solution, and precipitated molybdenum trisulfide is then separated by filtration. The acid used to lower the pH can be either sulfuric or hydrochloric and hydrochloric is preferred. With hydrochloric acid, the residual molybdenum levels in parts per million are less than 15. The amount of ammonium sulfide or thioacetamide added is not critical provided there is more than that amount required to react with the molybdenum present to form the trisulfide. As an example, 10 to 20 grams of ammonium sulfide per liter of sodium tungstate solution can be added and 1 to 3 grams of thioacetamide per liter of sodium tungstate solution can be added. This final step of preliminary purification provides a highly purified sodium tungstate solution for which the tungsten values can be removed and further purified by an ion exchange liquid.

Extracting Tungsten Values With Liquid Ion Exchange Medium

The organic liquid ion exchange medium comprises a three-component mixture in which the active ingredient is an amine salt. In effecting the exchange, the anionic portion of the amine salt, such as the chloride radical, is exchanged with the tungstate radical of the sodium tungstate in solution in order to form an amine tungstate and the corresponding sodium salt. The ion exchange liquid is immiscible with water and the ion exchange liquid and aqueous solution are settled in order to separate them, and thereafter are isolated from one another.

Figure 2:
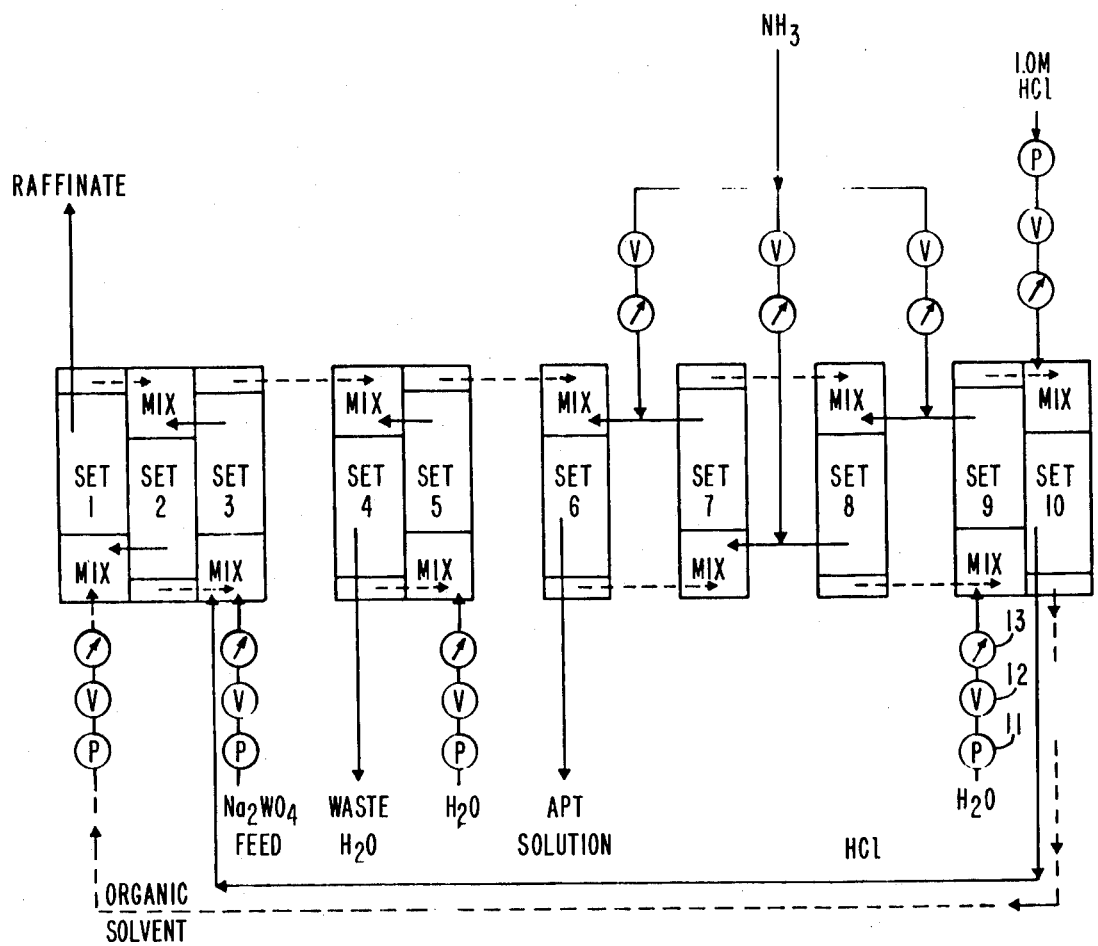
FIG. 2 is a diagrammatic view of the solvent extraction, washing, stripping, washing, and solvent regeneration apparatus.

In FIG. 2 is shown a diagrammatic view of the solvent extraction system flows with all flows indicated by the directions of the arrows. The aqueous medium flows are shown in solid lines and the organic medium is dashed. The system as shown comprises ten mixer-settler units combined in series to perform five separate functions. These functions comprise three stages of extraction, two stages of first wash, three stages of stripping for tungsten values, one stage of second wash, and one stage of organic solvent regeneration. In FIG. 2, the first three extraction stages operate counter-currently. The organic solvent, in either chloride or sulfate form, enters in mixer-settler 1 while sodium tungstate solution flow into mixer-settler 3. Tungsten is transferred from the aqueous medium to the organic in a liquid-liquid ion exchange process. The tungsten depleted aqueous solution is discarded as raffinate and the tungsten-loaded organic proceeds to the first wash stage.

The first wash stage has two counter-current stages, with dionized water entering into a mixer-settler 5 and loaded organic into mixer-settler 4. In these two stages, entrained salts and acids are removed from the organic stream. The cleaned, loaded organic then proceeds to the stripping section.

The stripping section consists of three mixer-settler units that operate in a counter-current mode. Water containing ammonia enters mixer 8 while the organic containing tungsten enters mixer-settler 6. In the strip section, tungsten is transferred to the aqueous from the organic, producing an ammonium tungstate solution. Ammonia gas is injected into the aqueous entering each stage to maintain a proper pH control. The stripped organic then flows to the second wash step.

The second wash step consists of one mixer-settler unit with deionized water and stripped organic entering into mixer-settler 9. This wash step removes entrained ammonium tungstate solution from the organic before it proceeds to the final stage in the closed loop process. The water from the wash flows to the strip section where it is used as the starting aqueous.

Mixer-settler unit 10 acidifies the organic, regenerating it into the sulfate or chloride form to be recycled to the extraction section for successive reuse. The acidified aqueous then flows to the mixer-settler 3 in the extraction section to acidify the sodium tungstate solution.

Flow in the system is provided by the use of positive displacement pump 11 with gravity-feed return lines. A lever control valve 12 between each stage permits adjustment of the liquid levels in the settlers. Flow indicator meters 13 are used to visually monitor all these streams into the system.

For purposes of simplicity of illustration, the sodium tungstate feed solution as shown in FIG. 2 has been expressed as $Na_2WO_4$. When the tungstate solution is acidified to a pH of 2 or 3, there will be formed a polyacid type tungstate having the formula $Na_3H_3W_6O_{21}$, and this complex radical is extracted pursuant to the following formulation:

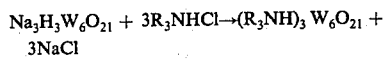

$$Na_3H_3W_6O_{21} + 3R_3NHCl \rightarrow (R_3NH)_3W_6O_{21} + 3NaCl$$

The active amine in the solvent can be a primary, secondary, tertiary, quaternary amine and as a specific example, a tertiary amine wherein $R = C_8-C_{10}$ is very satisfactory. The tungsten-complex-loaded amine and the aqueous sodium chloride solution are immiscible and are allowed to settle, and they are then isolated from one another. The amine salt has been indicated as the chloride and this is preferred over other salts such as sulfates or nitrates or bromides, for example.

In the solvent extraction step, as illustrated in the following formulation, two moles of ammonium hydroxide are needed for every mole of ammonium tungstate produced. Some of the ammonia can be supplied by recycling when it is later liberated in the crystallization process for forming the ammonium paratungstate.

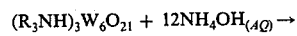

$$(R_3NH)_3W_6O_{21} + 12NH_4OH_{(AQ)} \rightarrow$$

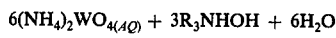

In the chemistry of the solvent regeneration process, the stripped amine is reacted with the desired acid to form the amine salt, pursuant to the following formulation.

$$3R_3NHOH + HCl \rightarrow R_3NHCl + H_2O$$

The amine is thus regenerated as a salt for recycling through the extraction steps.

As a specific example, the solvent extraction fluid is a three-component mixture comprising 10% by volume of tertiary amine wherein R is a long chain hydrocarbon of 8 to 10 carbons, 10% by volume of isodecanol which serves to enhance the efficacy of solvent extraction, and 80% by volume of purified kerosene which serves as a diluent. The foregoing materials are not critical to the solvent extraction and many other known materials can be substituted therefor. Similarly, the relative proportions of materials are no way critical. Many other examples of suitable amines, supplemental additives and diluents are listed in the aforementioned South African Pat. No. 684,892.

Summarizing the solvent extraction and stripping process, the purified sodium tungstate solution is contacted intimately, preferably by a counterflow, with a water-immiscible ion exchange liquid in which the active ingredient is amine salt, the anionic portion of which is exchanged with the tungstate radical of the sodium tungstate solution to form amine tungstate and the corresponding sodium salt. These immiscible liquids are settled to separate them, and they are then isolated from one another. Thereafter, the tungstate-containing ion exchange liquid is intimately contacted, preferably by counterflow, with ammonium hydroxide solution to form immiscible ammonium tungstate solution and tungstate-stripped ion exchange liquid. These immiscible liquids are settled to separate them, and the separated liquids are then isolated from each other.

Crystallization Of APT From Ammonium Tungstate Solution

The last step in the process is the crystallization of ammonium paratungstate from the solution of highly purified ammonium tungstate. Two methods are available, the first being categorized as an HCl-neutralization method. As a specific example, to 100 milliliters of starting solution, concentrated HCl is added with constant stirring until the pH stabilizes at 7.3. The solution is then covered and allowed to crystallize overnight. The APT crystals are collected, washed with 75 milliliters deionized water, and dried at 100° C. This reaction is illustrated in the following equation.

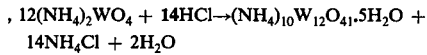

The second method of forming the APT crystals can be termed an NH$_3$ separation method. As an example, 100 milliliters of starting solution are evaporated to 10 milliliters with constant stirring at a temperature of 91° to 96° C, keeping the pH at about 8 by addition of concentrated NH$_4$OH. The resulting solution is covered and allowed to crystallize overnight. APT crystals can then be collected, washed with 75 ml deionized water, and dried at 100° C. This reaction is illustrated in the following equation.

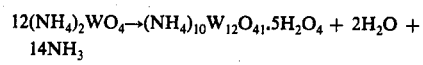

The NH$_3$-evaporation method is preferred since the generated ammonia can be recovered for further use in the process, thereby making this method more economical.

The crystallization step further purifies the resulting APT crystals and all impurity levels are below the established maximums which are permitted for lamp grade filaments.

We claim:

1. The method of obtaining highly purified ammonium paratungstate crystals from tungsten ore, said method comprising:
   (a) reducing the ore to be processed to a very finely divided status;
   (b) forming a slurry of the finely divided ore in a moderately strong HCl solution and digesting the slurry at a temperature at least about 100° C for a sufficient time to substantially convert the tungsten values in the ore to WO$_3$.H$_2$O, separating the resulting tungstic oxide from the acid solution to remove acid-soluble impurities from said tungstic oxide, and water washing the separated tungstic oxide to remove substantially all remaining water-soluble impurities therefrom;
   (c) dissolving the washed tungstic oxide in an aqueous solution of Na$_2$CO$_3$ or NaOH at a temperature slightly below the boiling point of water with the pH adjusted to a steady value of from about 8 to 8.5 to convert the insoluble tungstic oxide to soluble sodium tungstate solution, and separating the soluble sodium tungstate solution from remaining insoluble material to further remove impurities;
   (d) heating the resulting sodium tungstate solution to slightly below the boiling point of water and adding sodium hydroxide thereto to raise the pH to about 10.5 to 11.5, adding to said heated solution magnesium chloride in amount sufficient at least to lower the pH of said solution, thereafter adding to the resulting solution additional sodium hydroxide to raise the pH thereof to about 10.5 to 11.5 to precipitate as hydroxide the magnesium and additional metallic impurity leaving a further purified sodium tungstate solution, and separating the resulting sodium tungstate solution from the formed precipitate;
   (e) adding to the further purified sodium tungstate solution at least one of ammonium sulfide and thioacetamide in amount more than sufficient to react with any molybdenum impurity present to form MoS$_3$, and with the solution at a temperature slightly less than the boiling point of water acidifying the solution to a pH in the range of from about 2 to 3 to precipitate substantially all molybdenum as MoS$_3$ from the sodium tungstate solution, and separating the precipitated MoS$_3$ from the residual solution;
   (f) intimately contacting said purified sodium tungstate solution with a water-immiscible ion exchange liquid in which the active ingredient is amine salt the anionic portion of which is exchanged with the tungstate radical of said sodium tungstate solution to form amine tungstate and the corresponding sodium salt, settling said immiscible liquids to separate them, and isolating the separted liquids from each other;

(g) intimately contacting said tungstate-containing ion exchange liquid with ammonium hydroxide solution to form immiscible ammonium tungstate solution and tungstate-stripped ion exchange liquid, settling said immiscible liquids to separate them, and isolating the separated liquids from each other; and (h) converting said isolated ammonium tungstate solution to ammonium paratungstate crystals, and separating the precipitated ammonium paratungstate crystals from residual solution.

2. The method of obtaining highly purified ammonium paratungstate crystals from tungsten ore, said method comprising:

(a) reducing the ore to be processed to a very finely divided status having a particle size less than about 40 microns;

(b) forming a slurry of the finely divided ore in a 17 to 26 weight percent HCl solution and digesting the slurry at a temperature from about 100° C to 140° C for from 2 to 6 hours to substantially convert the tungsten values in the ore to $WO_3.H_2O$, separating the resulting tungstic oxide from the acid solution to remove acid-soluble impurities from said tungstic oxide, and water washing the separated tungstic oxide to remove substantially all remaining water-soluble impurities therefrom;

(c) dissolving the washed tungstic oxide in an aqueous solution of $Na_2CO_3$ or NaOH at a temperature from about 80° to 90° C with the pH adjusted to a steady value of from about 8 to 8.5 to convert the insoluble tungstic oxide to soluble sodium tungstate solution, and separating the soluble sodium tungstate solution from remaining insoluble material to further remove impurities;

(d) heating the resulting sodium tungstate solution to from about 80° to 90° C and adding sodium hydroxide thereto to raise the pH to about 10.5 to 11.5, adding to said heated solution magnesium chloride in amount sufficient at least to lower the pH of said solution, thereafter adding to the resulting solution additional sodium hydroxide to raise the pH thereof to about 10.5 to 11.5 to precipitate as hydroxide the magnesium and additional metallic impurity, leaving a further purified sodium tungstate solution, and separating the resulting sodium tungstate solution from the formed precipitate;

(e) adding to the further purified sodium tungstate solution at least one of ammonium sulfide and thioacetamide in amount more than sufficient to react with any molybdenum impurity present to form $MoS_3$, and with the solution at a temperature from about 70° C to 95° C acidifying the solution to a pH in the range of from about 2 to 3 to precipitate substantially all molybdenum as $MoS_3$ from the sodium tungstate solution, and separating the precipitated $MoS_3$ from the residual solution;

(f) intimately contacting said purified sodium tungstate solution with a water-immiscible ion exchange liquid in which the active ingredient is amine chloride the anionic portion of which is exchanged with the tungstate radical of said sodium tungstate solution to form amine tungstate and sodium chloride, settling said immiscible liquids to separate them, and isolating the separated liquids from each other;

(g) intimately contacting said tungstate-containing ion exchange liquid with ammonium hydroxide solution to form immiscible ammonium tungstate solution and tungstate-stripped ion exchange liquid, settling said immiscible liquids to separate them, and isolating the separated liquids from each other; and (h) evaporating a portion of said isolated ammonium tungstate solution to evolve ammonia and to precipitate ammonium paratungstate crystals therefrom, and separating the precipitated ammonium paratungstate crystals from residual solution.

3. The method as specified in claim 2, wherein said ion-exchange liquid comprises about 10 volume percent tertiary amine chloride ($R_3$NCHI) wherein R is a long chain hydrocarbon of 8 to 10 carbons, about 10 volume percent isodecanol, and about 80 volume percent of purified kerosene diluent.

4. The method as specified in claim 2, wherein said contact between said ion-exchange liquid and said purified tungstate solution, and said contact between said tungstate-containing ion exchange liquid and ammonium hydroxide solution, are achieved by flowing the respective solutions entering into said contacts from opposing directions to enhance the mixing therebetween.

* * * * *